United States Patent [19]

Mainard

[11] Patent Number: 5,397,140
[45] Date of Patent: Mar. 14, 1995

[54] SHOPPING CART HAVING GATE HINGED TO HANDLE

[75] Inventor: Tommy D. Mainard, Wagoner, Okla.

[73] Assignee: UNR Industries, Inc., Chicago, Ill.

[21] Appl. No.: 171,237

[22] Filed: Dec. 21, 1993

[51] Int. Cl.⁶ ............................................. B62B 11/00
[52] U.S. Cl. ............................ 280/33.992; 280/33.991;
    280/DIG. 4; 403/246; 403/260
[58] Field of Search ................. 280/33.991–33.993,
    280/33.995, 33.996–33.998, 79.3, DIG. 3, DIG.
    4, 651, 655, 47.34, 47.36; 411/500, 501;
    403/246, 247, 249, 252, 260, 379; D34/12;
    16/254, 373; 220/4.28, 4.29

[56] References Cited

U.S. PATENT DOCUMENTS

| | | | |
|---|---|---|---|
| D. 155,971 | 8/1948 | Concklin | D14/3 |
| 2,689,134 | 9/1954 | Lachance | 280/33.99 |
| 2,931,532 | 4/1960 | Gapp | 411/501 |
| 3,023,018 | 2/1962 | Welter | 280/33.99 |
| 3,361,438 | 1/1968 | Davis | 280/33.99 |
| 3,433,496 | 3/1969 | Kampf | 280/33.99 |
| 3,519,292 | 7/1970 | Krikorian | 403/260 |
| 3,614,133 | 10/1971 | Ganci | 280/33.99 R |
| 3,717,358 | 2/1973 | Mills | 280/33.99 R |
| 3,912,291 | 10/1975 | Frisch | 280/33.99 A |
| 4,046,394 | 9/1977 | Thompson | 280/33.991 |
| 5,289,936 | 3/1994 | Jones et al. | 280/33.991 |

FOREIGN PATENT DOCUMENTS 0364655  4/1990  European Pat. Off. ........ 280/33.991

*Primary Examiner*—Margaret A. Focarino
*Assistant Examiner*—Anne Marie Boehler
*Attorney, Agent, or Firm*—Dressler, Goldsmith, Shore & Milnamow Ltd.

[57] ABSTRACT

In a shopping cart comprising an undercarriage, a handle having two tubular portions extending generally upwardly from the undercarriage, and a basket mounted to the undercarriage and the handle, the basket has a gate hinged to the tubular portions of the handle via a hinge wire extending along an upper edge of the gate. Each end portion of the hinge wire extends through an inwardly opening aperture in an associated one of the tubular portions of the handle. Two rivets are employed, each having a head bearing against one such tubular portion of the handle, a tubular shank extending inwardly through an outwardly opening aperture in the same handle portion, and a mandrel drawn outwardly into the shank so as to expand the shank. As disposed within the tubular portions of the handle, the mandrels of the rivets limit axial movement of the hinge wire and retain the end portions of the hinge wire within the tubular portions of the handle, approximately at a centered position.

6 Claims, 1 Drawing Sheet

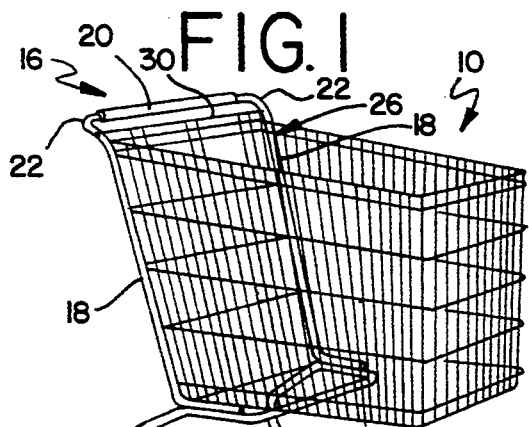
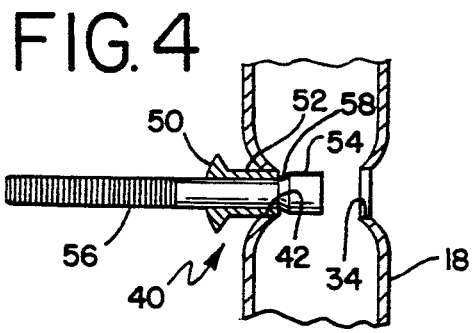
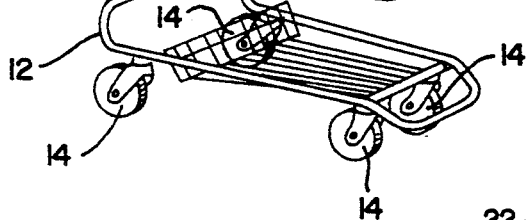
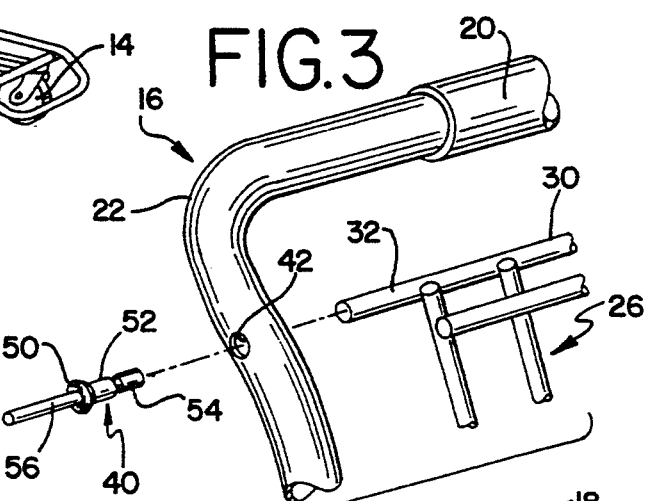
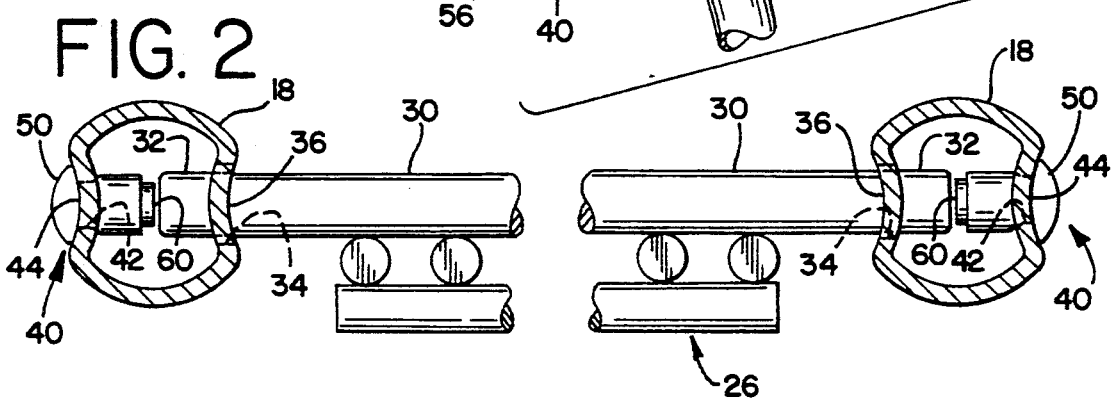
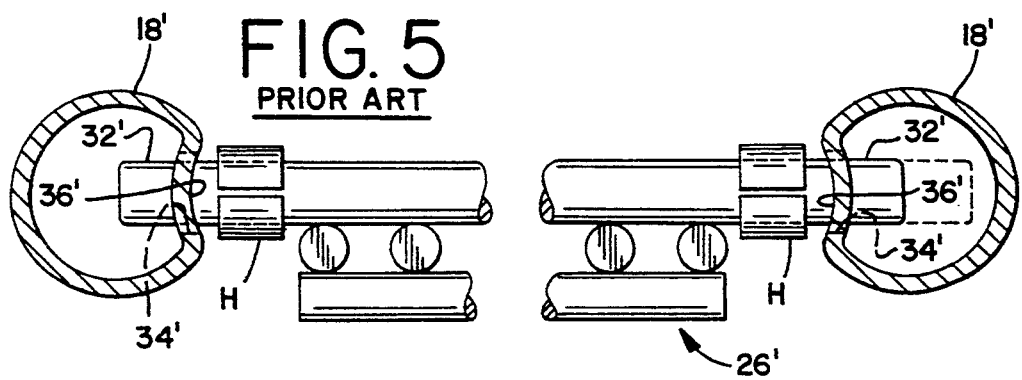

5,397,140

SHOPPING CART HAVING GATE HINGED TO HANDLE

TECHNICAL FIELD OF THE INVENTION

This invention pertains to a shopping cart of a type comprising an undercarriage, a handle having two tubular portions extending generally upwardly from the undercarriage, and a basket mounted to the handle and to the undercarriage, wherein the basket has a gate hinged to those portions of the handle. This invention contemplates that the gate is hinged to those portions of the handle in an improved manner.

BACKGROUND OF THE INVENTION

In a shopping cart of the type noted above, the basket has side, front, and bottom walls made of welded steel wires or of molded plastic panels or molded in one piece from a plastic material. Typically, the handle is made from one piece of bent steel tubing.

As hinged to the basket, the gate can be inwardly pivoted about a hinge axis at the upper edge of the basket, so as to permit a similar basket of a similar shopping cart to nest within the basket. Commonly, the gate is made of welded steel wires, which include a hinge wire extending along its upper edge. It is common for the gate to carry a foldable seat for an infant or a small child.

Conventionally, split rings of a type known as a hog ring are clamped around the hinge wire, near where the end portions of the hinge wire extend into inwardly opening apertures in the generally upwardly extending tubular portions of the handle. The hog rings are used to limit axial movement of the hinge wire and to retain the end portions of the hinge wire within those portions of the handle. Alternatively, it is known to use one hog ring, near where one end portion of the hinge wire extends into such an aperture.

In extensive or rough usage of the shopping cart, such a hog ring can open accidentally, whereupon the gate can be accidentally disassembled from the handle.

SUMMARY OF THE INVENTION

This invention provides a shopping cart comprising an undercarriage, a handle having two tubular portions extending generally upwardly from the undercarriage, and a basket mounted to the undercarriage and to the handle. The basket has a gate that is hinged to the handle in an improved manner.

The gate is hinged to the generally upwardly extending tubular portions of the handle, via a hinge wire extending along the upper edge of the gate and defining a hinge axis. The hinge wire has two end portions, each extending through an inwardly opening aperture in one of those handle portions.

Those handle portions are spaced from each other by a measurable distance at the inwardly opening apertures. The hinge wire has a sufficient length relative to said distance to permit the end portions to extend partly into said handle portions.

The shopping cart further comprises a structure extending inwardly into at least one of the generally upwardly extending tubular portions of the handle, toward at least one of the end portions of the hinge wire, so as to limit axial movement of the hinge wire relative to those handle portions and to retain the end portions of the hinge wire within those handle portions.

Preferably, a structure extends inwardly into each of those handle portions, toward whichever of the end portions of the hinge wire extends through the inwardly opening aperture therein, so as to limit axial movement of the hinge wire relative to those handle portions and to retain the end portions of the hinge wire within those handle portions. Preferably, moreover, the inwardly extending structures are disposed so as to retain the hinge wire approximately at a centered position relative to those handle portions.

Each generally upwardly extending tubular portion of the handle may have two apertures that are aligned substantially with each other and with the aligned apertures of the other such handle portion, namely an inwardly opening aperture that is the aperture receiving one of the end portions of the hinge wire and an outwardly opening aperture. Therefore, each of the inwardly extending structures may comprise a fastener having a portion extending inwardly through the outwardly opening aperture of an associated one of those handle portions.

In a preferred embodiment, each fastener is a rivet having a head bearing against the associated one of those tubular portions of the handle, a tubular shank defining the inwardly extending portion of such fastener, and a mandrel, over which the shank is drawn so as to expand the shank. The mandrels of the rivets define wear pads limiting axial movement of the hinge wire and retaining the end portions of the hinge wire within those handle portions.

Although it is preferred that the basket and the gate be made from welded steel wires, the basket or the basket and the gate may be wholly or partially made from plastic materials.

These and other objects, features, and advantages of this invention are evident from the following description of a preferred embodiment of this invention with reference to the accompanying drawings.

BRIEF DESCRIPTION OF THE DRAWINGS

FIG. 1 is a simplified, perspective view of a shopping cart embodying this invention.

FIG. 2, on a greatly enlarged scale, is a sectional view taken across two generally upwardly extending tubular portions of a handle of the shopping cart, showing a gate including a hinge wire with its end portions extending through apertures in those handle portions, and showing two rivets used to limit axial movement of the hinge wire and to retain the end portions of the hinge wire within those handle portions.

FIG. 3, on a smaller scale compared to FIG. 1, is a fragmentary, exploded view showing how one of those handle portions, one of the rivets, and the hinge wire are assembled.

FIG. 4, on an intermediate scale compared to FIGS. 2 and 3, is a sectional view taken along one of those handle portions and showing one of the rivets after it has been inserted into an aperture and before its tubular shank is drawn over its mandrel and before a cylindrical stem is removed.

FIG. 5, on the scale of FIG. 2, is an analogous view showing prior art employing hog rings to limit axial movement of a hinge wire and to retain the end portions of the hinge wire within two generally upwardly extending tubular portions of a handle of a shopping cart.

DETAILED DESCRIPTION OF PREFERRED EMBODIMENT

As shown in FIG. 1, a shopping cart 10 constituting a preferred embodiment of this invention comprises an undercarriage 12 with four caster wheels 14, a one-piece, tubular, steel handle 16 with two tubular portions 18 extending generally upwardly from the undercarriage 12 and a grip portion covered with an external grip 20 and joining the tubular portions 18 at their upper ends 22, and a basket 24 mounted to the undercarriage 12 and the handle 16. As shown, the basket 24 is made of welded wires. As disclosed in Jones et al. U.S. Pat. No. 5,255,930, the basket 24 may be alternatively made of molded plastic panels.

The basket 24 has a generally rectangular gate 26, which is made of welded wires, and which is hinged to the handle portions 18. The gate 26 may carry a foldable seat (not shown) of a type known heretofore, for an infant or a small child. The gate 26 is hinged to the handle portions 18, via a hinge wire 30 extending along the upper edge of the gate 26 and defining a hinge axis, so as to swing upwardly about the hinge axis to permit the basket of a similar cart (not shown) to nest into the basket 24. When the basket of a similar cart is not nested into the basket 24, the gate 26 is permitted to swing downwardly about the hinge axis so that the bottom edge of the gate 26 rests against a stop (not shown) at the bottom wall of the basket 24, near the rear edge of such wall. Such a stop is conventional.

As shown in FIG. 2, the hinge wire 30 has two end portions 32. Being tubular, each handle portion 18 defines a central axis. Moreover, each handle portion 18 has an inwardly opening aperture 34 in a dimpled area 36 in such handle portion 18.

At the inwardly opening apertures 34, the handle portions 18 are spaced from each other by a measurable distance. The hinge wire 30 is longer so as to permit each end portion 32 to extend outwardly into one of the handle portions 18 through the inwardly opening aperture 34 of such handle portion 18, approximately to the central axis defined by such handle portion 18, as shown in FIG. 2.

As shown in FIG. 5, in which elements designated by primed reference numbers are similar to elements designated by unprimed reference numbers in FIGS. 1 through 4, it is prior art to hinge a gate 26' to two generally upright tubular portions 18' of a handle 16' of a shopping cart 10' by causing each of two end portions 32' of a hinge wire 30' to extend outwardly through an inwardly opening aperture 34' in a dimpled area 36' in one of the handle portions 18' and by clamping two hog rings H around the hinge wire 30', near where the end portions 32' enter the apertures 34'. The hog rings H limit axial movement of the hinge wire 30' and retain the end portions 32' of the hinge wire 30' within the handle portions 18'. It also is prior art to extend the hinge wire 30 at one such end portion 32', as shown in dashed lines in FIG. 5, and to employ one hog ring H only, near where the opposite end portion 32' extends through such an aperture 34'.

As mentioned above, such a hog ring H can open accidentally in extensive or rough usage of the shopping cart 10', whereupon the gate 26' can be accidentally disassembled from the handle portions 18'. This invention, however, does not employ such a hog ring.

As the preferred embodiment of this invention, the shopping cart 10 further comprises two blind rivets 40 extending inwardly into the handle portions 18, through outwardly opening apertures 42 provided in dimpled areas 44 in the handle portions 18 and aligned with the inwardly opening apertures 34, toward the end portions 32 of the hinge wire 30. As shown in FIG. 2, each rivet 40 extends approximately to the central axis defined by one of the handle portions 18, so as to position the hinge wire 30 approximately at a centered position relative to the handle portions 18.

As shown in FIGS. 3 and 4, each rivet 40 before its installation has an annular head 50, a tubular shank 52 extending from the annular head 50, a cylindrical mandrel 54 having an outer diameter that is larger than the inner diameter of the tubular shank 52 before the installation of such rivet 40, and an elongate stem 56 that is unitary with the cylindrical mandrel 54 before the installation of such rivet 40. The annular head 50 and the tubular shank 52 are made in one piece. The cylindrical mandrel 54 and the elongate stem 56 are made in one piece. The cylindrical mandrel 54 adjoins the elongate stem 56 at a frusto-conical shoulder 58. As shown in FIG. 4, the cylindrical stem 56 is provided with a series of annular grooves, which facilitate gripping of such stem 56. Suitable blind rivets are available commercially from Huck International, Inc. of Irvine, Calif., under Part Number MGLV-R8-UN.

The gate 26 is installed so that each of the end portions 32 of the hinge wire 30 extends into one of the handle portions 18, through one of the inwardly opening apertures 34. The hinge wire 30 is installed by inserting one end portion 32 into one aperture 34, in which a rivet 40 has not yet been inserted, shifting the hinge wire 30 axially into the same aperture 34 for a sufficient distance to permit the other end portion 32 to be then inserted into the other aperture 34, and shifting the hinge wire 30 axially and oppositely to insert the latter end portion 32 into the latter aperture 34.

If one rivet 40 is inserted before the gate 26 is installed, the other rivet 40 is installed after the gate 26 has been installed. If neither rivet 40 is installed before the gate 26 is installed, both rivets 40 are installed after the gate 26 has been installed.

When each rivet 40 is inserted inwardly into the aperture 42 of the handle portion 18 to have such rivet 40, the piece comprising the elongate stem 56 and the cylindrical mandrel 54 extends inwardly into the handle portion 18 to have such rivet 40. Moreover, the piece comprising the annular head 50 and the tubular shank 52 is disposed around the elongate stem 56 with the tubular shank 52 pointing toward the cylindrical mandrel 54. Next, a suitable tool (not shown) is used to grip the elongate stem 56 and to press the annular head 50 toward the cylindrical mandrel 54, so as to press the tubular shank 52 over the cylindrical mandrel 54. When the tubular shank 52 is pressed thereover, the cylindrical mandrel 54 expands the tubular shank 52 to secure such rivet 40. After the tubular shank 54 has been expanded, the elongate stem 56 is broken away from the cylindrical mandrel 46.

The annular head 50 of each rivet 40 and the tubular shank 52 of each rivet 40, as expanded by the cylindrical mandrel 54 are larger than the associated aperture 42. Thus, after each rivet 40 has been installed, such rivet 40 is fixed to the associated portion 18 of the handle 16.

At their inner ends 60, the cylindrical mandrels 54 of the respective rivets 40 define wear pads, which limit axial movement of the hinge wire 30 relative to the handle portions 18, retain the end portions 32 of the hinge wire 30 within the handle portions 18, and retain the hinge wire 30 approximately at a centered position relative to the handle portions 18.

Various modifications may be made in the preferred embodiment described above without departing from the scope and spirit of this invention.

I claim:

1. A shopping cart comprising an undercarriage, a handle having two tubular portions extending generally upwardly from the undercarriage, a basket mounted to the undercarriage and the handle, the basket having a gate hinged to said portions of the handle via a hinge wire extending along an upper edge of the gate, the hinge wire defining a hinge axis and having two end portions, each end portion extending through an inwardly opening aperture in one of said handle portions, said handle portions being spaced from each other by a measurable distance at the inwardly opening apertures, the hinge wire having a sufficient length relative to said distance to permit the end portions to extend partly into said handle portions, the shopping cart further comprising structures extending inwardly into the said handle portions, toward the end portions of the hinge wire and in fixed positions relative to said handle portions, so as to permit but limit axial movement of the hinge wire relative to said handle portions and relative to the inwardly extending structures and to retain the end portions of the hinge wire within said handle portions.

2. The shopping cart of claim 1 wherein the inwardly extending structures are disposed so as to retain the hinge wire approximately at a centered position relative to said handle portions.

3. The shopping cart of claim 1 wherein each such handle portion has two apertures aligned substantially with each other and with the aligned apertures of the other such handle portion, namely the inwardly opening aperture and an outwardly opening aperture, and wherein each of the inwardly extending structures is defined by a fastener having a portion extending inwardly through the outwardly opening aperture of an associated one of said portions of the handle.

4. A shopping cart comprising an undercarriage, a handle having two tubular portions extending generally upwardly from the undercarriage, a basket mounted to the undercarriage and the handle, the basket having a gate hinged to said portions of the handle via a hinge wire extending along an upper edge of the gate, the hinge wire defining a hinge axis and having two end portions, each end portion extending through an inwardly opening aperture in one of said handle portions, said handle portions being spaced from each other by a measurable distance at the inwardly opening apertures, the hinge wire having a sufficient length relative to said distance to permit the end portions to extend partly into said handle portions, the shopping cart further comprising structures extending inwardly into the said handle portions, toward the end portions of the hinge wire, so as to limit axial movement of the hinge wire relative to said handle portions and to retain the end portions of the hinge wire within said handle portions, wherein each such handle portion has two apertures aligned substantially with each other and with the aligned apertures of the other handle portion, namely the inwardly opening aperture and an outwardly opening aperture, wherein each of the inwardly extending structures is defined by a fastener having a portion extending inwardly through the outwardly opening aperture of an associated one of said portions of the handle, wherein each fastener is a rivet having a head bearing against the associated one of said portions of the handle, a tubular shank defining the inwardly extending portion of said fastener, and a mandrel, over which the shank is drawn so as to expand the shank, and wherein the mandrels of the rivets define wear pads limiting axial movement of the hinge wire and retaining the end portions of the hinge wire within said portions of the handle.

5. A shopping cart comprising an undercarriage, a handle having two tubular portions extending generally upwardly from the undercarriage, a basket mounted to the undercarriage and the handle, the basket having a gate hinged to said portions of the handle via a hinge wire extending along an upper edge of the gate, the hinge wire defining a hinge axis and having two end portions, each end portion extending through an inwardly opening aperture in one of said handle portions, said handle portions being spaced from each other by a measurable distance at the inwardly opening apertures, the hinge wire having a sufficient length relative to said distance to permit the end portions to extend partly into said handle portions, the shopping cart further comprising a structure extending inwardly into at least one of said handle portions, toward whichever of the end portions of the hinge wire extends through the inwardly opening aperture therein and in a fixed position relative to the handle, so as to permit but limit axial movement of the hinge wire relative to said handle portions and to the inwardly extending structure and to retain the end portions of the hinge wire within said handle portions.

6. The shopping cart of claim 5 wherein the handle portion having the inwardly opening aperture has an outwardly opening aperture aligned substantially with the inwardly opening aperture, the inwardly extending structure being a rivet having a head bearing against the handle portion having the inwardly and outwardly opening apertures, a tubular shank extending inwardly through the outwardly opening aperture, and a mandrel, over which the shank is drawn so as to expand the shank, the mandrel defining a wear pad limiting axial movement of the hinge wire toward the mandrel.

* * * * *